Jan. 28, 1969 A. H. BOBECK 3,425,035

MAGNETIC CIRCUIT

Filed Aug. 9, 1965

MEMORY

INVENTOR
A. H. BOBECK
BY Herbert M. Shapiro
ATTORNEY

United States Patent Office 3,425,035

Patented Jan. 28, 1969

3,425,035

MAGNETIC CIRCUIT

Andrew H. Bobeck, Chatham, N.J., assignor to Bell Telephone Laboratories Incorporated, New York, N.Y., a corporation of New York Filed Aug. 9, 1965, Ser. No. 478,168

U.S. Cl. 340—166 6 Claims

Int. Cl. H04q 3/00

ABSTRACT OF THE DISCLOSURE

Common mode noise is suppressed in a magnetic memory by coupling groups of word conductors, associated with an X coordinate in an access switch driving the memory, with a community magnetic core. When one of the so coupled conductors is pulsed, discharging currents flowing in nonselected conductors due to the effect of voltage changes on capacitive couplings between digit and word conductors of the memory arise. The core loads all such currents so that although those conductors are coupled through the selected Y coordinate of the access switch to ground only negligible discharging currents result.

Figure 1:
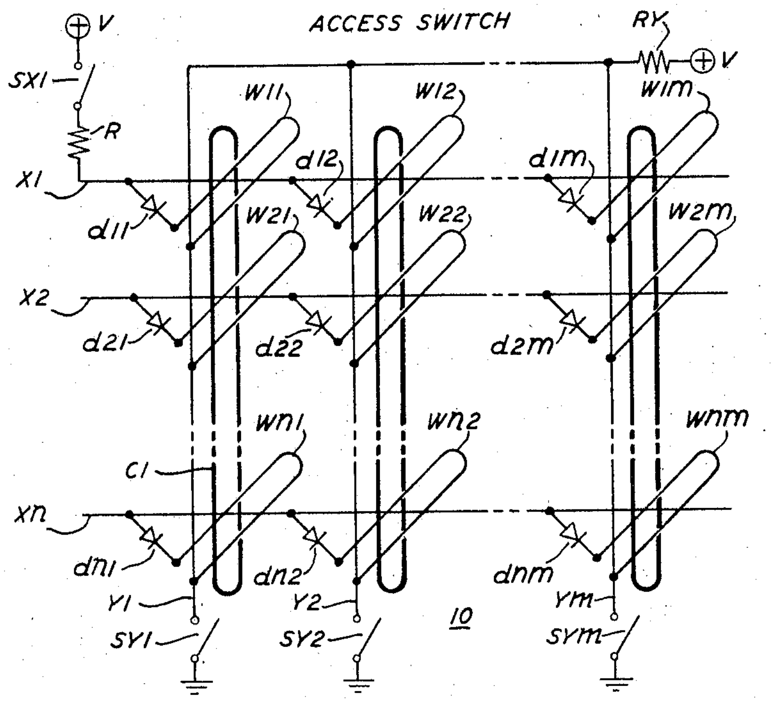

This invention relates to information stores and, more particularly, to circuits for the suppression of noise therein.

Selection switches employing, for example, diodes at crosspoints therein are generally preferred over biased-core access switches for memory access because of the higher operating speed capabilities thereof as is well known. Diode selection switches, however, do not provide the electrical isolation characteristics of biased-core switches. Specifically, in acessing word-organized memories, voltage changes occurring in the coordinate conductors of the access switch, during word selection operations, produce currents in digit conductors of the memory. These currents accumulate along digit conductors and result in spurious output signals. The coupling from the access circuit to digit conductors is due to distributed capacitance between coordinate word and digit conductors of the memory. Specifically, voltage changes in coordinate conductors of the access switch during a "select" operation permit the capacitance to discharge. Consequently, currents flow in like directions in corresponding digit conductors and the return paths therefor. The resulting signal (noise) is commonly termed "common mode noise," the phenomenon being well understood (see "Electronic Design," Aug. 3, 1964, page 38 et seq.).

Common mode noise is rejected, in accordane with prior art teaching, most simply, by threading each digit conductor and its return path through a nonsaturable magnetic core. In this manner, common mode currents flowing in the digit conductor and the return path "see" a high impedance which reduces the "noise" in detectors in series therewith. The magnetic cores are termed "common mode chokes" or "baluns". Unfortunately, this common mode rejection arrangement alone frequently has been found inadequate.

Accordingly, an object of this invention is to provide a new and novel common mode choke arrangement.

The invention is based to a large extent on the realization that the cause of common mode noise is essentially eliminated economically if magnetic cores are positioned about groups of word conductors of the memory rather than about individual digit conductors. More specifically, it has been found that individual cores may serve a community of word conductors in eliminating common mode noise without interfering with the selection of particular word conductors for memory operation. In this arrangement, the cause of common-mode currents, that is the capacitance discharging currents, is essentially eliminated. This is in contradistinction to the damping of common-mode currents, once generated, as provided by the aforedescribed prior art arrangement. In one particular embodiment, in accordance with this invention, all the word conductors associated with one coordinate of the access switch and the return paths for those word conductors are threaded through a single core.

Accordingly, a feature of this invention is a single inductance means for loading, in a like manner, all word conductors along a coordinate of the access switch.

Not only are fewer cores used, in accordance with this invention, but also fewer turns are required for coupling thereto to produce suitable inductances on the word conductors. A specific example illustrates the advantages of such an arrangement. Consider a 32 x 32 diode selection switch for 1024 words where each word includes say 60 bits. Accordingly, a coordinate of the memory comprises 32 words, 60 bits long. A common mode choke on each digit conductor requires 60 cores for the entire memory (the digit conductors thread all the planes of the memory). Individual cores on the word conductors would require, uneconomically, 1024 cores. In contradistinction, community cores on the word conductors, in accordance with this invention, require only 32 cores. In addition, 32 discharging currents in the conductors coupled by a single core contribute to providing across the core a voltage drop offsetting the voltage change in each of the conductors so coupled.

Figure 2:
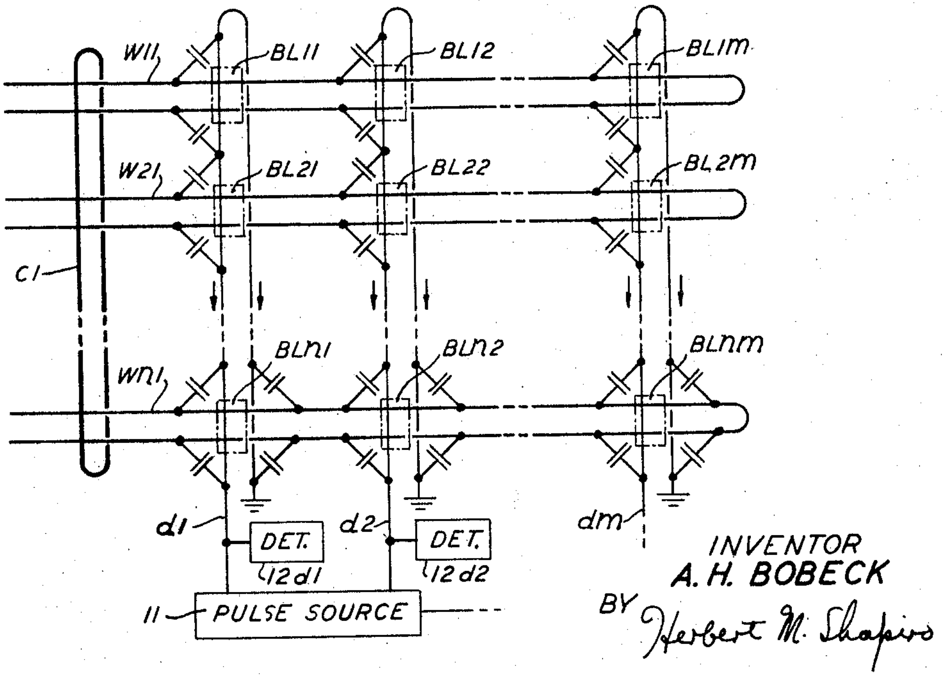

A complete understanding of the present invention together with the objects and features thereof can be gained from a consideration of the following detailed description taken in conjunction with the accompanying drawing, in which:

FIGS. 1 and 2 are schematic representations of an access switch and a portion of a memory, respectively, including the noise suppression arrangement in accordance with this invention.

FIG. 1 shows a diode matrix selection switch 10 including X coordinate conductors referenced X1 . . . X*n* and Y coordinate conductors referenced Y1 . . . Y*m* between coordinate pairs of which diodes *d*11 . . . *dnm* are connected, corresponding to crosspoints there. The diode designations include numeral designations corresponding to the X and Y conductors, respectively, to which each is connected.

The diodes are poled to permit current to flow from the X conductors into the Y conductors. The figure shows the cathode portion of each diode separated from the connection thereof to the corresponding Y conductor by a conductive loop designated W11 . . . W*nm*, as above, which loops serve first as the output circuits of the access switch and, importantly, as word conductors of a word-organized memory driven by that access switch. Each X conductor of the access switch is connected via a resistance R to a positive voltage, +V, through normally open switch SX1. This arrangement is well known and shown only for conductor X1. The Y conductors are connected through normally open switch SY1, SY2 . . . SY*m* to ground at one end and, through a resistance RY, to a positive voltage +V at the other. Generally, a like positive voltage is applied to the X and Y conductors.

FIG. 2 shows a plane of a generalized three-dimensional memory driven by the access switch of FIG. 1. The figure shows a plurality of word conductors W11 . . . W*n*1, also appearing in FIG. 1. Orthogonal to these conductors are a plurality of digit conductors, designated *d*1 . . . *dm*. The digit conductors are connected between a digit pulse source 11 and individual detectors **12*d*1, 12*d*2, . . . at one end and ground at the other. Word and digit conductors intersect to form crosspoints which typically correspond to bistable magnetic elements represented by broken squares designated BL11** . . . BL*nm* (bit locations). It is noted that each word conductor includes a return path, not separately designated, and that all the word conductors and the associated return paths associated with each Y conductor of the access switch are coupled by a single core, for example, core C1. For simplicity, this is illustrated only for one plane of the memory. Other planes in the memory are identical. Distributed capacitances between word and digit conductors in the memory are indicated by capacitance symbols at the various crosspoints.

The efficacy of this invention is demonstrated by showing that the selection of a word conductor during a read operation results in only negligible capacitive coupled currents flowing in digit conductors of the memory. Attention is directed to the read operation because during write operations outputs are ignored and any currents generated in digit conductors are also ignored at that time. In accordance with this invention, however, capacitive coupled currents are obviated during write operations also as will become apparent hereinfater.

Illustratively, it is assumed that word conductor W11 is selected for a read operation. To this end, switch SX1 and switch SY1 are closed under the control of control circuitry not shown. Such operation of the access switch as well as the operation of word-organized memories in response is well known and a discussion thereof is not necessary for an understanding of this invention. Suffice it to say that a read pulse is applied to conductor W11 during a read operation. The various detectors, pulse sources, diode arrangements, magnetic elements, et cetera, may be any such elements capable of operation in a conventional mode of operation for diode selection switches and word-organized memories.

In the assumed illustrative operation, conductors Y1 and X1 of access switch 10 experience changes in potential between +V and ground and "select" current flows through diode *d*11 from the positive potential source connected to conductor X1 to ground at the Y1 conductor. Although select current flows only in word conductor W11, a potential (voltage) change from +V to ground appears in all the word conductors associated with the Y1 conductor of the access switch, that is, word conductors W11, W12, . . . W1*m*. This change in voltage in the word conductors permits the distributed capacitances previously charged to a +V level to discharge through the now grounded Y1 conductor of the access switch and, thus, cause (common mode) currents to flow in the digit conductors of the plane of the memory associated with the word conductor and in the return paths for those conductors. The core C1, however, inductively loads all capacitance discharging currents for each of those word conductors such that only negligible discharging currents result. Consequently, only negligible common mode currents flow in the corresponding digit conductors during a read operation. Since the selected word conductor including the return path therefor is threaded through the core C1, there is no net effect of the inductance of the core on select currents of opposing polarity flowing in the selected word conductor and in the return path therefor. In this ma~uer, the common mode noise problem is substantially eliminated in accordance with this invention by a community magnetic core coupled to all the word conductors along a coordinate of the access switch without influence on the selection currents. Moreover, since the charging currents in all the word conductors associated with a core in accordance with this invention mutually contribute to the voltage drop $$\left(L\frac{di}{dt}\right)$$

across the core, a suitable inductance L of that core is provided with relatively few turns.

In a specific embodiment in accordance with this invention, a cylindrical film memory of 1024 words having 80 bits per word was operated with a 32 x 32 diode selection switch. Each group of 32 words along a Y coordinate threaded a community nonsaturable core. The core was of ferrite material having a permeability of 2000 and was coupled to each associated word conductor by a single turn. Distributed capacitances measured 0.2 pf. (picofarad) (mean) for each word-digit coupling. Positive voltage values of 15 volts were employed. The total current discharging the distributed capacitance in the memory when a word conductor was selected was ten milliamperes. This is to be compared to typically 400 milliamperes discharging current measured in comparable prior art arrangements.

What has been described is considered to be only illustrative of the principles of this invention. Accordingly, various and numerous other arrangements may be devised by one skilled in the art without departing from the spirit and scope of this invention.

What is claimed is:

1. In combination, an access switch having crosspoints therein arranged electrically in series, an output circuit for each of said crosspoints, and a single magnetic core coupled to said output circuits for inductively loading said circuits alike in response to voltage changes at said crosspoints.

2. In combination, an access switch having crosspoints therein arranged electrically in a coordinate array and inductance means including a plurality of magnetic cores each coupled to all the output circuits along each of a set of like coordinates for inductively loading said circuits alike in response to voltage changes at said crosspoints.

3. A combination in accordance with claim 2 wherein said cores are nonsaturable.

4. A combination in accordance with claim 3 wherein wherein said access switch comprises a coordinate relay of diodes.

5. A combination in accordance with claim 4 wherein each of said output circuits comprises a word conductor of a memory.

6. A combination in accordance with claim 5 wherein each of said word conductors includes a return path and all the word conductors and return paths along each of said like coordinates are coupled to a single core, each of said word conductors and the corresponding return path being connected across a different diode along the corresponding coordinate.

References Cited

UNITED STATES PATENTS

| | | | |
|---|---|---|---|
| 2,955,281 | 10/1960 | Brennemann et al. | 340—173.2 |
| 3,161,862 | 12/1964 | Williams | 340—174 |

DONALD J. YUSKO, *Primary Examiner.*

U.S. Cl. X.R.

340—174